(12) United States Patent  
Hirose

(10) Patent No.: US 7,171,306 B2
(45) Date of Patent: Jan. 30, 2007

(54) ROUTE SEARCHING SYSTEM, ROUTE SEARCHING METHOD, NAVIGATION SYSTEM AND COMPUTER PROGRAM PRODUCT

(75) Inventor: Chihiro Hirose, Saitama (JP)

(73) Assignee: Pioneer Corporation, Tokyo (JP)

( * ) Notice: Subject to any disclaimer, the term of this patent is extended or adjusted under 35 U.S.C. 154(b) by 245 days.

(21) Appl. No.: 10/829,423

(22) Filed: Apr. 22, 2004

(65) Prior Publication Data

US 2004/0215389 A1    Oct. 28, 2004

(30) Foreign Application Priority Data

Apr. 25, 2003   (JP)   .............................. 2003-122819

(51) Int. Cl.
*G06T 1/00*   (2006.01)
*G09B 29/00*   (2006.01)
*G01C 21/00*   (2006.01)

(52) U.S. Cl. ...................... 701/209; 701/201; 701/208; 701/211; 340/995.21

(58) Field of Classification Search ................ 701/209, 701/201, 202, 208, 204; 340/995.11, 995.14, 340/995.15, 995.21, 995.23, 995.27; 705/400
See application file for complete search history.

(56) References Cited

U.S. PATENT DOCUMENTS 5,893,081 A * 4/1999 Poppen ....................... 705/400
5,899,955 A * 5/1999 Yagyu et al. ................ 701/209
5,910,177 A * 6/1999 Zuber .......................... 701/202
5,911,773 A * 6/1999 Mutsuga et al. ............. 701/200
5,983,720 A * 11/1999 Crabb et al. .............. 73/514.26
5,991,689 A * 11/1999 Aito et al. ................... 701/209
6,125,323 A * 9/2000 Nimura et al. .............. 701/207
6,377,887 B1 * 4/2002 Poppen et al. .............. 701/201
6,490,522 B2 * 12/2002 Sugiyama et al. .......... 701/211

FOREIGN PATENT DOCUMENTS

JP          9-325038 A      12/1997

* cited by examiner

*Primary Examiner*—Tan Q. Nguyen
(74) *Attorney, Agent, or Firm*—Sughrue Mion, PLLC

(57) ABSTRACT

A route searching system is provided with: a road map database for storing a road map data; a searching device for performing a link cost calculation on the basis of the road map data and thereby searching an optimal route. The searching device increases or decreases the link cost of a link corresponding to a road section that requires a difficult turn on a route option, the difficult turn being a right turn or a left turn, one of which is more difficult than the other in accordance with a traffic rule, and connecting a node corresponding to an intersection, in at least two cases depending on the difficulty of the difficult turn at the intersection.

17 Claims, 9 Drawing Sheets

(a)

(b)

(a)

(b)

(a)

(b)

ROUTE SEARCHING SYSTEM, ROUTE SEARCHING METHOD, NAVIGATION SYSTEM AND COMPUTER PROGRAM PRODUCT

BACKGROUND OF THE INVENTION

1. Field of the Invention

The present invention relates to a route searching system and method used for searching an optimal route in an on-vehicle type navigation system and the like. The present invention further relates to a navigation system including the route searching system, and relates to a computer program product for a route searching.

2. Description of the Related Art

In this kind of route searching system, for example, link costs of a route option, that is a route candidate, to a destination are calculated in a Dijkstra method, on the basis of road map data including at least nodes corresponding to intersections and at least a link corresponding to a road section between two nodes. More specifically, for example, a length of each road section consisting of the route option is converted to a link cost, and a total cost from a starting point or a current position to the destination is calculated for each route option. Finally or after repeating the calculation by certain times, one route option whose total cost is the lowest is searched as an optimal route.

Particularly, with regard to real roads, there are some tendencies, depending on traffic rules or regulations of individual countries. For example, it is often difficult to turn right at an intersection in Japan where drivers keep to the left side of the road. On the other hand, it is often difficult to turn left at an intersection in the United States of America where drivers keep to the right side of the road. In view of this, there is a technique in that a plurality of route options are searched by means of the aforementioned link cost calculation and one route option in which the number of the right turns is the lowest is determined as an optimal route (reference is made to Japanese Patent Application Laid-Open No. Hei 9-325038).

According to the aforementioned technique, however, under actual traffic conditions or road conditions, such a route option including certain right turns are eliminated from the route options presented by the navigation system, even in the case that it takes the shortest time to arrive at the destination only if the driving route contains certain right turns.

On the contrary, according to a technique in which a right turn and a left turn are not distinguished as seen in conventional route searching systems, or a technique in which a left turn simply takes a priority than a right turn (e.g. a technique in which a link cost of a road section that requires a right turn is set at a higher value than that of a road section that requires a left turn.), it is impossible to search an optimal route, taking account of actual traffic conditions that are varied depending on, for example, whether a right turn lane and/or a traffic signal with a right turn indicator exist(s) or not, even with regard to the same right turn. That is, in the technique in which a right turn and a left turn are not distinguished, a right turn may be indicated as a result of the route searching, at an intersection that may be very difficult to turn right under actual traffic conditions. Otherwise, similarly to the case disclosed by the aforementioned Japanese Patent Application Laid-Open No. Hei 9-325038, a right turn is not indicated but a "go straight" sign or a left turn may be indicated as a result of the route searching, even at an intersection that may be very easy to turn right under actual traffic conditions.

SUMMARY OF THE INVENTION

The present invention has accomplished in view of the aforementioned problems for example. It is therefore an object of the present invention to provide a route searching system and method that allow a route searching further adapted to actual traffic conditions. It is further an object of the present invention to provide a navigation system provide with such a route searching system, and provide a computer program product for serving a computer as such a navigation route searching system.

The above object of the present invention can be achieved by a route searching system provided with: a road map database for storing a road map data, the road map data including (i) node data that indicates nodes that correspond to predetermined kinds of points on a road including at least an intersection, and (ii) link data that indicates a link that corresponds to a road section that connects the predetermined kinds of points on a road corresponding to the nodes; and a searching device for calculating link costs as for individual links that correspond to individual road sections that consist of individual route options from a first point to a second point, on the basis of the road map database, and thereby searching one of the individual route options whose total link cost is the lowest, as an optimal route, from among a plurality of links that correspond to all the road sections of the individual route options, wherein the searching device increases or decreases the link cost of a link corresponding to a road section that requires a difficult turn on the individual route options, the difficult turn being the right turn or the left turn one of which is more difficult than the other in accordance with a traffic rule, and connecting to a node that corresponds to the intersection, in at least two cases depending on difficulty of the difficult turn at the intersection.

The above object of the present invention can be achieved by a route searching system provided with: a road map database for storing a road map data, the road map data including data that indicates (i) intersections and (ii) a road section connecting the intersections; and a searching device for calculating a cost, that is a quantitative index of the difficulty or facility in driving as for individual road sections that consist of individual route options from a first point to a second point, on the basis of said road map database, and thereby searching one of the individual route options whose total cost is the lowest, as an optimal route, from among all the road sections of the individual route options, wherein said searching device increases or decreases the cost of a road section that requires a difficult turn after passing the intersection on the individual route options from among a plurality of road sections that consist of all road sections of the individual route options, the difficult turn being the right turn or the left turn one of which is more difficult than the other in accordance with a traffic rule, in at least two cases depending on difficulty of the difficult turn at the intersection.

The above object of the present invention can be achieved by a route searching method of calculating link costs as for individual links that correspond to individual road sections that consist of individual route options from a first point to a second point, on the basis of a road map database for storing a road map data, the road map data including (i) node data that indicates nodes that correspond to predetermined kinds of points on a road including at least an intersection, and (ii) link data that indicates a link that corresponds to a road section that connects the predetermined kinds of points on a road corresponding to the nodes; and thereby searching one of the route options whose total link cost is the lowest, as an optimal route, from among a plurality of links that correspond to all the road sections of the route options, the method provided with: a determining process of determining a link corresponding to a road section that requires a difficult turn on the route options, the difficult turn being the right turn or the left turn one of which is more difficult than the other in accordance with a traffic rule, and connecting to a node that corresponds to the intersection, on the basis of the road map database; and a increasing or decreasing process of increasing or decreasing the link cost of the determined link, in at least two cases depending on difficulty of the difficult turn at the intersection.

The above object of the present invention can be achieved by a route searching method of calculating a cost, that is a quantitative index of the difficulty or facility in driving as for individual road sections that consist of individual route options from a first point to a second point, on the basis of a road map database for storing a road map data, the road map data including data that indicates (i) intersections and (ii) a road section connecting the intersections; and thereby searching one of the individual route options whose total cost is the lowest, as an optimal route, from among all the road sections of the individual route options, the method provided with: a determining process of determining a road section that requires a difficult turn after passing the intersection on the individual route options from among a plurality of road sections that consist of all road sections of the individual route options, the difficult turn being the right turn or the left turn one of which is more difficult than the other in accordance with a traffic rule; and an increasing or decreasing process of increasing or decreasing the cost of the determined road section, in at least two cases depending on difficulty of the difficult turn at the intersection.

The above object of the present invention can be achieved by a computer program product in a computer-readable medium for tangibly embodying a program of instructions executable by a computer to make the computer function as at least a searching device for calculating link costs as for individual links that correspond to individual road sections that consist of individual route options from a first point to a second point, on the basis of a road map database, and thereby searching one of the individual route options whose total link cost is the lowest, as an optimal route, from among a plurality of links that correspond to all the road sections of the individual route options, wherein said searching device increases or decreases the link cost of a link corresponding to a road section that requires a difficult turn on the individual route options, the difficult turn being the right turn or the left turn one of which is more difficult than the other in accordance with a traffic rule, and connecting to a node that corresponds to the intersection, in at least two cases depending on difficulty of the difficult turn at the intersection.

(Route Searching System)

An aspect of a first route searching system according to the present invention is provided with: a road map database for storing a road map data, the road map data including (i) node data that indicates nodes that correspond to predetermined kinds of points on a road including at least an intersection, and (ii) link data that indicates a link that corresponds to a road section that connects the predetermined kinds of points on a road corresponding to the nodes; and a searching device for calculating link costs as for individual links that correspond to individual road sections that consist of individual route options from a first point to a second point, on the basis of the road map database, and thereby searching one of the individual route options whose total link cost is the lowest, as an optimal route, from among a plurality of links that correspond to all the road sections of the individual route options. The searching device increases or decreases the link cost of a link corresponding to a road section that requires a difficult turn on the individual route options, the difficult turn being the right turn or the left turn one of which is more difficult than the other in accordance with a traffic rule, and connecting to a node that corresponds to the intersection, in at least two cases depending on difficulty of the difficult turn at the intersection.

According to the first route searching system, the road map data, which includes the node data and the link data, is stored in the road map database. The node data indicates nodes that correspond to the predetermined kinds of points on the road including at least an intersection. The predetermined kinds of points on the road may be various kinds of intersections such as a crossroad, a trifurcated intersection (i.e. a junction of three roads), a "star-shaped" intersection (i.e. a junction of five roads) and so on, and may be a furcation, a crossing, an entrance/exit of a particular building or facility, a parking, an interchange on a high way, a service area on a high way, toll gate of a tollway and so on. This road map database is configured entirely or partially by a large volume of storage device such as an optical disc device, a hard disk device, a memory device and so on, which may be mounted on an on-vehicle unit of the navigation system, or may be mounted within a server device that is connected to an on-vehicle unit of a communication navigation system via a communication network. Alternatively, this road map database may be configured within a personal computer, a cell phone or the like that a user uses for the route searching, or may be configured within a server device that is connected to the personal computer, the cell phone or the like via Internet or the like.

During operation of the route searching system, that is, during the route searching, the searching device calculates link costs of individual links corresponding to individual road sections that consist of a route option from a starting point or a current position as the first point to a final destination or a way point as the second point, on the basis of the road map data. The Dijkstra method is employed for this calculation. Usually, link costs corresponding to all the road sections are calculated with regard to each of a plurality of route options. Thereby, a plurality of route options from the first point to the second point are usually obtained. Incidentally, in the case that only one route option is obtained, this route option may be determined as the optimal route.

Particularly, the searching device increases or decreases a link cost of a link corresponding to a road section that requires a difficult turn on a route option, the difficult turn being a right turn or a left turn, one of which is more difficult than the other in accordance with a traffic rule, and connecting a node corresponding to an intersection, in at least two cases depending on the difficulty of the difficult turn (e.g. the right turn) at the intersection. For example, the "difficulty in the right turn" herein is determined quantitatively or qualitatively in real time or in advance, on the basis of an existence or non-existence of a right turn lane, an existence or non-existence of a traffic signal, an existence or non-existence of a traffic signal with a right turn indicator, a change in a road width before and after the right turn and so on. The link cost is increased or decreased in at least two cases, on the basis of the difficulty in the right turn that is determined as such. That is, even with regard to the same right turn, the link cost is increased or decreased in at least two cases, depending on the difficulty in the right turn, instead of a case that a link cost of a link corresponding to a road section that requires a right turn is simply increased or decreased, relative to a link corresponding to a road section that requires a left turn (e.g. a case that a link cost of a link corresponding to a road section that requires a left turn is set at +2.0 point, and a link cost of a link corresponding to a road section that requires a right turn is set at +4.0 point), after passing an intersection (non-specific). For example, if there are the right turn lane and the traffic signal with the right turn indicator, the link cost of the link corresponding to a road section immediately after the right turn is increased by +3.0 points. For example, if there is not the right turn lane but the traffic signal with the right turn indicator, the link cost of the link corresponding to a road section immediately after the right turn is increased by +4.0 points. For example, if there is not the right turn lane nor the traffic signal with the right turn indicator, the link cost of the link corresponding to a road section immediately after the right turn is increased by +5.0 points.

This increase or decrease of the link cost may be performed, after the route option from the first point to the second point is obtained in the Dijkstra method. Alternatively, it may be performed, after a half route option from the first point on the way to the second point is obtained, or may be performed sequentially as a judgement whether or not each link consisting of the route option, that is determined at any given time in the route searching processing, corresponds to the difficult turn (e.g. the right turn) is performed sequentially and the result of the judgement is appeared.

After the searching device increases or decreases the link cost depending on the difficulty in turning at the intersection, a route option whose total link cost over a plurality of links corresponding to all the road sections is the lowest is determined as the optimal route from among a plurality of route options. Incidentally, in the case that only one route option is obtained as discussed above, this route option may be determined as the optimal route, regardless of its total link cost. In this case, the increase or decrease of the link cost depending on the difficulty in turning at the intersection may be performed or may not be performed.

This searching device is configured entirely or partially by a processing device such as a system controller, a computer and so on, which may be mounted on an on-vehicle unit of the navigation system, or may be mounted within a server device that is connected to the on-vehicle unit of a communication navigation system via a communication network. Alternatively, this searching device may be configured within a personal computer, a cell phone or the like that a user uses for the route searching, or may be configured within a server device that is connected to the personal computer, the cell phone or the like via Internet or the like.

Consequently, according to the route searching system, unlike the technique disclosed by the aforementioned Japanese Patent Application Laid-Open No. Hei 9-325038, the route option including the right turn therein is not eliminated, in the case that the right turn at the intersection remarkably saves time to arrive at the destination under actual traffic conditions or actual road conditions. On the contrary, another route option in which the right turn is not included is selected as the optimal route in preference to the route option including the right turn therein, in the case that the right turn shortens a travel distance to the destination, but the right turn itself takes considerably time. That is, even with regard to the same right turn, it is possible to search the optimal route, taking account of actual traffic conditions under which the right turn may be easy or difficult. Thus, the optimal route searching further adapted to actual traffic conditions can be performed.

In an aspect of the first route searching system according to the preset invention, the searching device judges a link corresponding to the road section that requires the difficult turn, and connecting to a node that corresponds to the intersection, from among said plurality of links, on the basis of the road map database, and increases or decreases the link cost of the judged link, depending on the difficulty of the difficult turn.

According to this aspect, the searching device judges a link corresponding to the road section that requires the difficult turn (e.g. the right turn) at the intersection, from among a plurality of links consisting of all the road sections, as for each of the route options. This judgement of the link may be performed after the route option from the first point to the second point is obtained in the Dijkstra method for example. Alternatively, it may be performed after a half route option from the first point on the way to the second point is obtained, or may be performed for each of links that are determined as the route option at mid time point in the route searching processing. The link cost of the judged link is increased or decreased, depending on the difficulty of the difficult turn (e.g. the right turn) at the intersection. Therefore, the optimal route searching further adapted to actual traffic conditions can be performed.

In another aspect of the first route searching system of the present invention, the searching device increases or decreases the link cost of a link corresponding to the road section that requires the difficult turn, depending on at least one of a road width, the number of lanes, a road type and an existence of a traffic signal, which are indicated by attribute information of the link or the node included in at least one of the link data or the node data.

According to this aspect, the searching device increases or decreases the link cost of the link corresponding to the road section that requires the difficult turn (e.g. the right turn) at the intersection, on the basis of at least one of the road width before and after the right turn, the number of lanes before the right turn, the road type before and after the right turn, the existence or non-existence of the signal at the intersection and so on, which are indicated by the attribute information of the node or the attribute information of the link, which are included in the node data and the link data, respectively. Therefore, the optimal route searching further adapted to actual traffic conditions can be performed. For this, the searching device may be arranged to increase or decrease the link cost as for a plurality of cases, depending on a plurality kinds of combinations of attribute information.

Incidentally, the searching device may be arranged to increase or decrease the link cost, on the basis of so-called "real time congestion information" such as VICS (Vehicle Information and Communication System) or the like, instead of or in addition to the attribute information. For example, even with regard to the same right turn, in the case that the real time congestion information indicates that the right turn lane is sparse, the link cost may be increased by +3.0 points. In the case that the real time congestion information indicates that the right turn lane is dense, the link cost may be increased by +5.0 points. In the case that the real time congestion information indicates that the right turn lane is very dense, the link cost may be increased by +10.0 points.

In another aspect of the first route searching system according to the present invention, the searching device, firstly calculates temporarily link costs of a plurality of links corresponding to said all the road sections, and then judges whether or not a link corresponding to a road section that requires a difficult turn exists in said plurality of links corresponding to said all the road sections, and if exists, calculates link costs of said plurality of links corresponding to all the road sections, by adding a first predetermined value to link costs that are temporarily calculated, depending on the difficulty of the difficult turn.

According to this aspect, firstly, for example in the Dijkstra method, the link costs of a plurality of links corresponding to all the road sections from the first point to the second point are temporarily calculated as for each of the route options. Then, it is judged whether or not a link corresponding to a road section that requires a difficult turn (e.g. a right turn) exists in a plurality of links corresponding to all the road section. If such a link exists, the first predetermined value is added, depending on the difficulty in turning at the intersection, to the link cost that is temporarily calculated. For example, if the right turn exists in the route option, the first predetermined value, which is set as for two or more cases depending on the difficulty in turning at the intersection, is added to the link cost of the route option that is searched in the Dijkstra method for example. Thereby, the link costs are calculated for each route option, and finally the route option whose total link cost after this addition is the lowest is determined as the optimal route. Therefore, the existence of the link corresponding to the road section that requires the difficult turn (e.g. the right turn) is judged under a condition that all the road sections consisting of the individual route options are known. It is very advantageous in practice to facilitate the judgement.

In an aspect as for the temporarily calculation of the link cost, the searching device may be arranged to increase the first predetermined value, as a connection angle formed by two links connected to the node corresponding to the intersection decreases.

In this arrangement, even with regard to the same right turn for example, the first predetermined value is increased to thereby relatively increase the link cost, in the case that the angle for the right turn at the intersection is small. On the other hand, even with regard to the same right turn for example, the first predetermined value is not increased to thereby relatively decrease the link cost, in the case that the angle for the right turn at the intersection is big. Incidentally, the "connection angle" according to the present invention is based on a travel direction of the own car that advances along the road (route or route option). The connection angle has a nature of decreasing as the curve or turn becomes tight. Therefore, the link cost as for the route option that includes a tight curve or turn, which is often difficult to turn, is relatively increased. As a result, the route option that includes a tight curve or turn is hardly selected as the optimal route. Thus, the optimal route searching further adapted to actual traffic conditions can be performed. For this, the predetermined value may be increased in two stages, or in three or more stages. Alternatively, it may be increased continuously or consecutively depending on the connection angle.

In an aspect as for the temporarily calculation of the link cost, the searching device may be arranged so that it temporarily calculates the link cost, and then judges whether or not a link corresponding to a road section that requires an easy turn, the easy turn being the right turn or the left turn one of which is easier than the other, exists in said plurality of links corresponding to said all the road sections, and if exists, calculates link costs of said plurality of links corresponding to said all the road sections, by adding a second predetermined value, which is smaller than the first predetermined value, to link costs that are temporarily calculated In this arrangement, after the link cost is temporarily calculated, it is judged whether or not the link corresponding to the road section that requires the easy turn (e.g. the left turn) exists in said plurality of links corresponding to said all the road sections. If such a link exists, for example if the left turn exists in the route option, the second predetermined value, which is smaller than the first predetermined value to be added to the link cost depending on the difficulty in turning, is added to the aforementioned link cost that is temporarily calculated. Thereby, link costs are calculated as for individual route options, and finally the route option whose total cost is the lowest after this predetermined value addition is determined as the optimal route. Therefore, the existence of the link corresponding to the road section that requires the easy turn (e.g. the left turn) is judged under a condition that all the road sections consisting of the individual route options are known. It is very advantageous in practice to facilitate the judgement. Thus, the optimal route searching further adapted to actual traffic conditions can be performed.

Incidentally, the searching device may be arranged to increase the second predetermined value, as the connection angle formed by two links that are connected to the node corresponding to the intersection becomes small. For this, the second predetermined value may be increased in two stages, or in three or more stages. Alternatively, it may be increased continuously or consecutively depending on the connection angle.

In another aspect of the first route searching system according to the present invention, the searching device determines a node corresponding to the intersection, on the basis of a connection angle formed by two links connected to each node on the route options, and increases the link cost of the link corresponding to the road section that requires the difficult turn and connecting to the determined node corresponding to the intersection.

According to this aspect, for example, by using azimuth information at an end of each link, as attribute information of the link, the connection angle formed by two links that are connected to the node can be obtained in a simple subtraction. Furthermore, the node corresponding to the intersection that requires the difficult turn (e.g. the right turn) on the route option can be determined, from a relative easy and prompt judgement process in which it is determined that the right turn is required in the case that the connection angle obtained as such is bigger than a predetermined threshold value, such as ninety degrees in the right direction or sixty degrees in the right direction, otherwise one hundred twenty degrees or more in the right direction. Then, the link cost can be increased or decreased, with regard to the determined link involving the right turn and being connected to the node. Thereby, the link cost can be increased or decreased in a relative simple manner, depending on the difficulty in turning, even with regard to the same right turn.

A second route searching system according to the present invention is provided with: a road map database for storing a road map data, the road map data including data that indicates (i) intersections and (ii) a road section connecting the intersections; and a searching device for calculating a cost, that is a quantitative index of the difficulty or facility in driving as for individual road sections that consist of individual route options from a first point to a second point, on the basis of said road map database, and thereby searching one of the individual route options whose total cost is the lowest, as an optimal route, from among all the road sections of the individual route options, wherein the searching device increases or decreases the cost of a road section that requires a difficult turn after passing the intersection on the individual route options from among a plurality of road sections that consist of all road sections of the individual route options, the difficult turn being the right turn or the left turn one of which is more difficult than the other in accordance with a traffic rule, in at least two cases depending on difficulty of the difficult turn at the intersection.

According to the second route searching system, the road map data including data that indicates intersections and road sections is stored into the road map database. Then, on operation of the route searching system, the searching device calculates costs of individual road sections consisting of individual route options from the first point to the second point, on the basis of the road map data. The "cost" herein is an index to quantitatively indicate the difficulty or facility in driving on the individual road sections. The "cost" is also an index to quantitatively indicate the difficulty or facility in driving on the individual route options, by accumulating or summing costs of the individual road sections as elements, with regard to a plurality of road sections or a route or route option consisting from a plurality of road sections. For example, the "cost" is a quantitative index to evaluate a route with regard to time to travel the route, toll, travel distance and so on, and may be of the cost or the link cost used for the existing Dijkstra method or the like, or may be of the cost based on a new basis configured in accordance with the specific evaluation standard. Furthermore, with regard to the road map data including the data to indicate intersections and road sections, the node data and the link data used for the existing Dijkstra method may be employed, or the road map data based on a new basis to indicate intersections and road sections may be employed.

During the route searching, usually, costs corresponding to all the road sections are calculated for each of a plurality of road options. Thereby, usually, a plurality of route options from the first point to the second point are obtained. Particularly, the searching device increases or decreases the cost of the road section, which connects to the intersection and requires the difficult turn, the difficult turn being the right turn or the left turn one of which is more difficult than the other in accordance with a traffic rule, from among a plurality of road sections consisting of all the road sections, in at least two cases depending on difficulty of the difficult turn (e.g. the right turn) at the intersection. That is, at any desired intersection, even with regard to the same right turn, the costs are increased or decreased in at least two cases depending on the difficulty in turning. Thus, after the costs are increased or decreased depending on the difficulty in turning at the intersection, the route option whose total cost from the first point to the second point (i.e. the sum total of costs of a plurality of road sections corresponding to all the road sections) is the lowest is determined as the optimal route, from among a plurality of route options.

As a result, according to the second route searching system, similarly to the aforementioned first route searching system, the optimal route searching further adapted to actual traffic conditions can be performed.

In another aspect of the first and second route searching systems according to the present invention, the system is further provided with: an inputting device for inputting a starting point or a current position as the first point and inputting a destination as the second point; and an outputting device for outputting the searched optimal route in a predetermined format.

According to this aspect, via the inputting device including various inputting devices, such as a panel switch; a remote control; a set of numeric keypad; a keyboard; an audio inputting unit and so on, a starting point is inputted as the first point at the route searching. Alternatively, if the route searching system is incorporated into the navigation system, a current position obtained separately from the starting point is inputted as the first point, in addition to or instead of the starting point, via the inputting device such as input interface or the like. Furthermore, via the inputting device such as the panel switch or the like, a destination, which may be the final point to go or an on-route point to go, is inputted as the second point. Then, the searching device performs the optimal route searching based on the road map data, and the outputting device outputs the optimal route, which is searched as such, in a predetermined format. For example, the optimal route is outputted in a form of video output or audio output, through the display or the speaker as one example of the outputting device. Alternatively, it may be outputted in a predetermined data format to a removal type record medium or a stationary type record medium. Otherwise, it may be outputted in predetermined data format carried on a carrier wave via a communication network. Thus, inputting the starting point or the current point and the destination via the inputting device, the optimal route connecting these points is automatically outputted in various form or format from the outputting device. This is very convenient for the user.

(Navigation System)

A navigation system according to the present invention is provided with: the aforementioned first or second route searching system (including various aspects thereof); a locating device for locating a current position; and a route guiding device for performing predetermined kinds of route guidance, on the basis of the current position that is located by the locating device and the optimal route that is searched by the searching device.

The navigation system according to the present invention is provided with the locating device such as a GPS (Global Positioning System) device, or such as a self-containing (also referred to as "stand anole") device including an acceleration sensor, an angular velocity sensor, an odometer and so on. Then, the route guiding device including a CPU (Central Processor Unit), a display, a speaker and so on performs a predetermined kind of route guidance, on the basis of (i) the current point that is located by the locating device and (ii) the optimal route that is searched by the aforementioned route searching system. Particularly in this performance, since the aforementioned route searching system is employed, the route guidance based on the optimal route further adapted to actual traffic conditions can be performed.

In an aspect of the navigation system according to the present invention, the system is further provided with: a center device and a navigation terminal device, which are connected to each other via a communication network, wherein at least a part of the road map database is included in the center device, and the locating device and the route guiding device are included in the navigation terminal device.

According to this aspect, the navigation system can be configured as a so-called "communication navigation system". Particularly for this, it is very advantageous in practice that advantages of the communication navigation system, including improved management of the road map database or improved flexibility in updating the database, and downsizing or cost-reduction in record device or in processing device in the on-vehicle unit, are obtained, and the aforementioned advantages of the route searching system according to the present invention are obtained.

(Route Searching Method)

The first route searching method according to the present invention is a route searching method of calculating link costs as for individual links that correspond to individual road sections that consist of individual route options from a first point to a second point, on the basis of a road map database for storing a road map data, the road map data including (i) node data that indicates nodes that correspond to predetermined kinds of points on a road including at least an intersection, and (ii) link data that indicates a link that corresponds to a road section that connects the predetermined kinds of points on a road corresponding to the nodes; and thereby searching one of the route options whose total link cost is the lowest, as an optimal route, from among a plurality of links that correspond to all the road sections of the individual route options, the method being provided with: a determining process of determining a link corresponding to a road section that requires a difficult turn on the individual route options, the difficult turn being the right turn or the left turn one of which is more difficult than the other in accordance with a traffic rule, and connecting to a node that corresponds to the intersection, on the basis of said road map database; and a increasing or decreasing process of increasing or decreasing the link cost of the determined link, in at least two cases depending on a difficulty of the difficult turn at the intersection.

According to the first route searching method of the present invention, similarly to the first route searching system according to the present invention mentioned above, the optimal route searching further adapted to actual traffic conditions can be performed.

Incidentally, in response to the aforementioned various aspects of the first route searching system according to the present invention, also the first route searching method according to the present invention can take various aspects.

The second route searching method according to the present invention is a route searching method of calculating a cost, that is a quantitative index of the difficulty or facility in driving as for individual road sections that consist of individual route options from a first point to a second point, on the basis of a road map database for storing a road map data, the road map data including data that indicates (i) intersections and (ii) a road section connecting the intersections; and thereby searching one of the individual route options whose total cost is the lowest, as an optimal route, from among all the road sections of the individual route options, the method being provided with: a determining process of determining a road section that requires a difficult turn after passing the intersection on the individual route options from among a plurality of road sections that consist of all road sections of the individual route options, the difficult turn being the right turn or the left turn one of which is more difficult than the other in accordance with a traffic rule; and an increasing or decreasing process of increasing or decreasing the cost of the determined road section, in at least two cases depending on a difficulty of the difficult turn at the intersection.

According to the second route searching method of the present invention, similarly to the second route searching system according to the present invention mentioned above, the optimal route searching further adapted to actual traffic conditions can be performed.

Incidentally, in response to the aforementioned various aspects of the second route searching system according to the present invention, also the second route searching method according to the present invention can take various aspects.

(Computer Program Product)

The computer program product for the route searching according to the present invention is a computer program product in a computer-readable medium for tangibly embodying a program of instructions executable by a computer, which is disposed in the first or second route searching system according to the present invention (including various aspects thereof), to make the computer function as at least the searching device as mentioned above.

According to the computer program product for the route searching of the present invention, the computer program product can be read from the record medium, such as a ROM, a CD-ROM, a DVD-ROM, a hard disk and so on, in which the computer program product is stored, and the computer program product can be then executed, or the computer program product may be downloaded into the computer via the communication network and then executed, to present the navigation apparatus according to the present invention relatively easily.

Incidentally, in response to various aspects of the first or second route searching system according to the present invention mentioned above, the computer program product according to the present invention can take various aspects.

As discussed above, according to the first or second route searching system according to the present invention, the road map database and the searching device are employed. Furthermore, according to the first or second route searching method, the determining process and the searching process are employed. Thereby, even with regard to the same right turn, the optimal route can be searched, taking account of traffic conditions under which the difficulty or facility in the right turn is varied. Thus, the optimal route searching further adapted to actual traffic conditions can be performed.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS (Embodiments)

With reference to drawings, specific examples of a navigation system including a route searching system according to the present invention will be discussed.

(Fundamental Construction)

Figure 1:
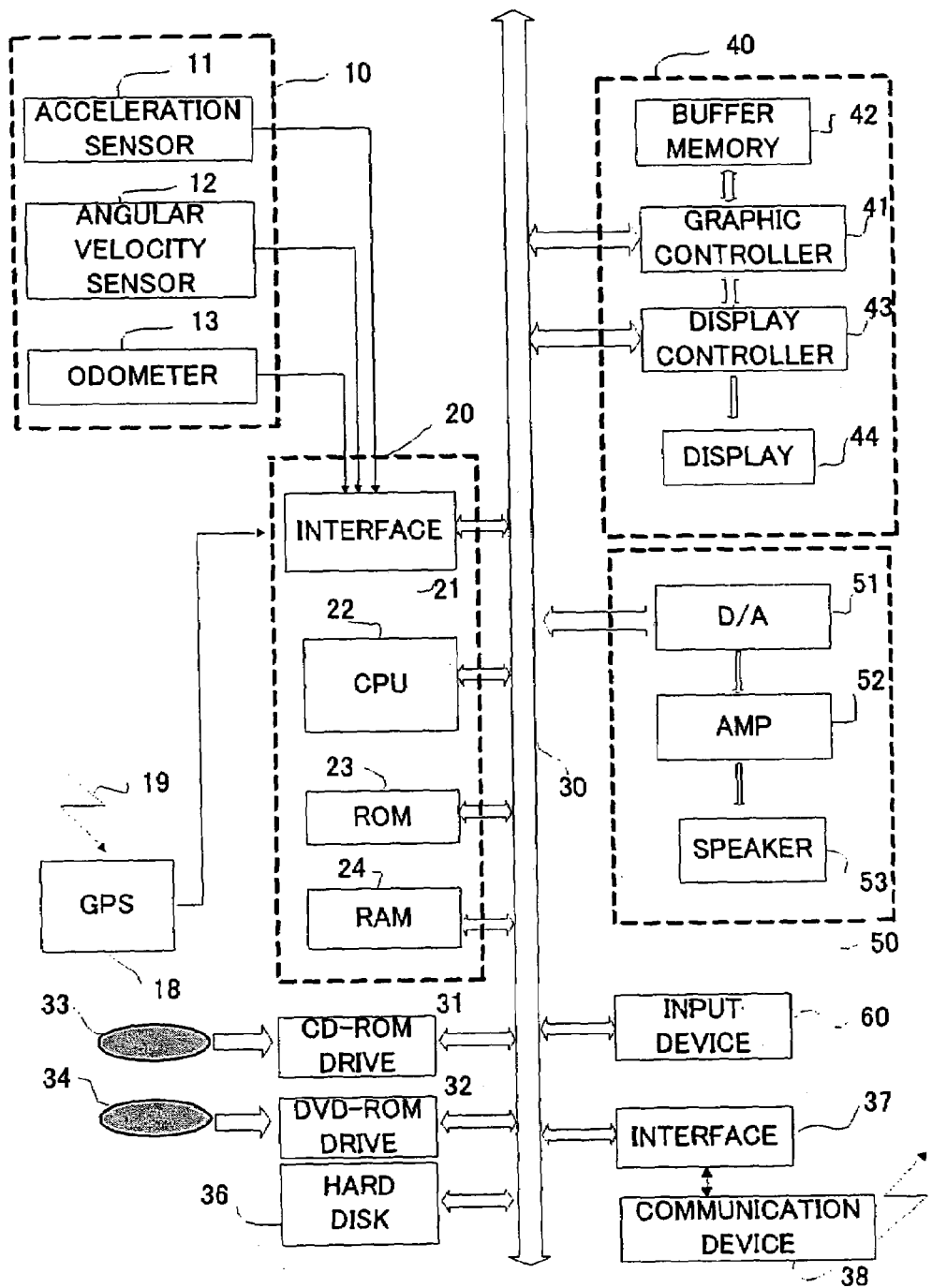
FIG. 1 is a block diagram illustrating a fundamental construction of a navigation apparatus in an embodiment of the present invention.

Firstly, with reference to FIG. 1, a fundamental construction of a navigation apparatus in this embodiment will be discussed. FIG. 1 is a block diagram illustrating a construction of the navigation apparatus in this embodiment.

As shown in FIG. 1, the navigation apparatus is provided with: a sensor portion 10; a GPS receive portion 18; a control portion 20; a data bus 30; a CD-ROM drive 31; a DVD-ROM drive 32; a hard disk 36; a video output portion 40; an audio output portion 50; an input device 60; and a communication device 38.

The sensor portion 10, which is provided with: an acceleration sensor 11; an angular velocity sensor 12; and an odometer 13, is for detecting information about a movement of a navigation object itself. The acceleration sensor 11 is for detecting an acceleration of the navigation object, and may calculate the velocity from the detected acceleration. The angular velocity sensor 12 is for detecting an angular velocity of the navigation object. The odometer 13 is for detecting a travel distance of the navigation object.

The GPS receive portion 18 may locate a current position of the navigation object by transmitting and receiving information to and from GPS satellites via a radio wave 19 with using a receiver or the like.

The control portion 20, which controls the navigation apparatus as a whole, is provided with: an interface 21; a CPU 22; a ROM 23; and a RAM 24. The interface 21 transmits and receives data to and from the sensor portion 10 and the GPS receive portion 18, and outputs the received data to the CPU 22. The CPU 22 locates the current position of the navigation object on the basis of the data that is inputted via the interface 21. The CPU 22 controls the navigation apparatus as a whole on the basis of an arithmetic operation. Particularly in this embodiment, the CPU 22 controls the CD-ROM drive 31, the DVD-ROM drive 32 or the hard disk 36, as mentioned below in detail, and reads map data included in the CD-ROM 33, the DVD-ROM 34 or the hard disk 36 and stores the read map data into the RAM 24. Alternatively, the CPU 22 stores map data received at the communication device 38 into the RAM 24. Then, on the basis of the data stored into the RAM 24, the CPU 22 performs navigation processings. The ROM 23 includes a microprogram or the like therein, and defines an operation of the control portion 20. The RAM 24, which may be provided with a volatile semiconductor memory such as a DRAM or a SDRAM, is used as a record medium for recording data during the operation of the CPU 22.

The data bus 30 is used for a data transfer between the control portion 20, the CD-ROM drive 31, the DVD-ROM drive 32, the hard disk 36, the video output portion 40, the audio output portion 50, the input device 60 and the interface 37, respectively.

The CD-ROM drive 31 or the DVD-ROM drive 32 is a device for reading the CD-ROM 33 or the DVD-ROM 34 in which the map data is stored.

The hard disk 36 may be a substitution of the CD-ROM 33 or the DVD-ROM 34, i.e. stores the map data or reads the map data, if needed, under control of the CPU 22.

The video output portion 40, which is provided with: a graphics controller 41; a buffer memory 42; a display control portion 43; and a display 44, displays a road map, a road condition or a route guidance and so on under control of the CPU 22 in accordance with the navigation processings, otherwise displays an image to input an external command. The graphics controller 41, which may include a microcomputer or the like, is for controlling a display processing as a whole. The buffer memory 42, which may include a semiconductor memory such as a DRAM, stores video data that is subjected to the display processing, and inputs or outputs the video data in accordance with an I/O (Input/Output) command of the graphics controller 41. The display control portion 43 controls the display 44 and performs the display processing, under control of the graphics controller 41. The display 44, which may include an LCD (Liquid Crystal Display) or a CRT (Cathode Ray Tube) display, actually displays the video data.

The audio output portion 50 is provided with: a D/A (Digital/Analog) converter 51; an amplifier 52; and a speaker 53, and outputs sound under control of the control portion 20 in accordance with the navigation processings. The D/A converter 51 converts a digital audio signal that is outputted within the navigation apparatus into an analog audio signal. The amplifier 52 amplifies the analog audio signal that is converted from the digital audio signal, and controls an output level thereof. The speaker 53 converts the analog audio signal that is amplified at and outputted from the amplifier 52 into sound, and outputs the sound.

The input device 60, which may include: a remote controller; a controller; or a touch panel and so on, receives an external command to the navigation apparatus. Furthermore, the input device 60 may include an audio input device for receiving a voice command directly from a user.

The interface 37 controls an I/O between each devices and data that is transferred between the communication device 38 and a data center via a data transfer.

The communication center 38, which is provided with a transceiver capable of transferring information via a communication network, regardless of wired or wireless, may performs the data transfer with the data center or the like and transfer required information.

Next, with reference to FIG. 2 to FIG. 6, an operation of the navigation apparatus in this embodiment will be discussed.

Figure 2:
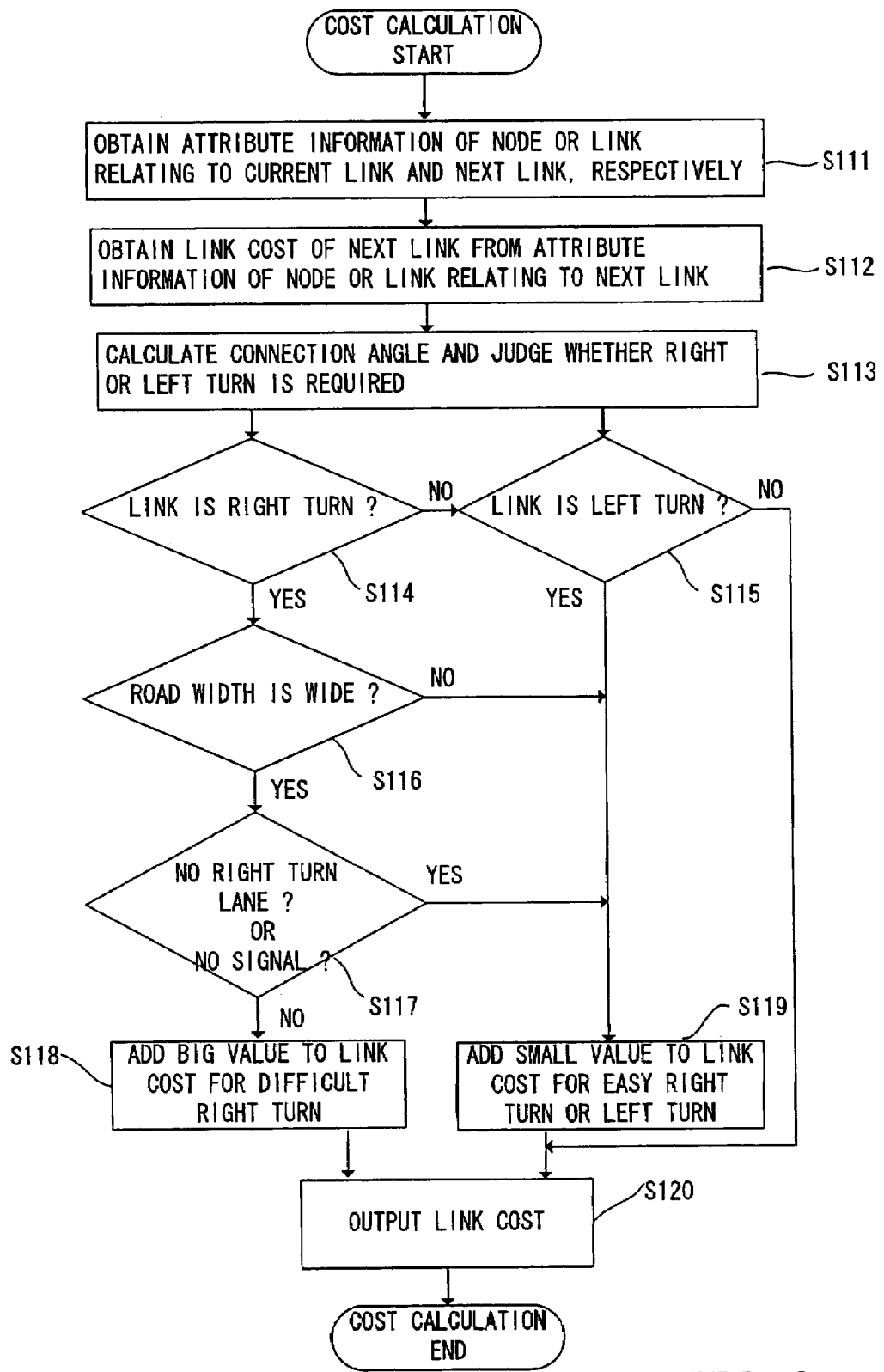
FIG. 2 is a flow chart illustrating an operation of predetermined navigation processings of the navigation apparatus in the embodiment of the present invention.

Firstly, with reference to FIG. 2, a cost calculation processing executed in a route searching system included in the navigation apparatus in this embodiment will be discussed. FIG. 2 is a flow chart illustrating the cost calculation processing. In this embodiment, the route searching system is constructed in the navigation apparatus with a road map database that is stored in the CD-ROM 33, the DVD-ROM 34 or the hard disk 36 and so on and the control portion 20.

In this embodiment, the control portion 20 (i.e. CPU 22) calculates link costs with regard to individual links that correspond to individual road sections that constitute a route option (i.e. route candidate) from a first point to a second point, and further calculates a total cost with regard to each individual route option, in a Dijkstra method for example. In this link cost calculation, one of the individual links that correspond to the individual road sections that constitute the route option from the first point to the second point is referred to as a "current link", and link costs with regard to all links that connect to nodes to which the current link connects are calculated. Incidentally, in the cost calculation processing in this embodiment, all links that connect to nodes to which the current link connects are all referred to as "next link", respectively, and a cost link is calculated with regard to one of all the next link, in a procedure shown in FIG. 2.

Firstly, in FIG. 2, the controller 20 (i.e. CPU) reads the road map data, in which node data and link data of the current link are included and in which node data and link data with regard to one of all the next link data are included, from the road map database, and stores the read road map data into the RAM 24 (step S111). This reading of the road map data is preferably performed by reading the road map data at a time throughout an area covering the first point and the second point. Nevertheless, the road map data may be read in a smaller area or unit, if needed. Thereby, the control portion 20 obtains (i) attribute information of the current link, which is included in the link data of the current link, (ii) attribute information of the next link, which is included in the link data of the next link, (iii) attribute information of nodes to which the current link connects, which is included in the node data of the current link, and (iv) attribute information of nodes to which the next link connects, which is included in the node data of the next link.

Next, the control portion 20 calculates temporarily the link cost of this next link (step S112), on the basis of the attribute information of the node or the link, which is included in at least one of the node data and the link data of the obtained next link. The attribute information of the node or the link, which is included in at least one of the node data and the link data of the next link obtained by the control portion 20, indicates road length, type, width, traffic congestion and so on of the road section that corresponds to this next link. Basically, the control portion 20 calculates temporarily the link cost with a manipulation to increase a cost of the next link, on the basis of the road length from among the listed informations. Incidentally, information about the traffic congestion and so on may be taken in real time in VICS or the like.

Next, the control portion 20 calculates an angle defined by the current link and the next link, i.e. an connection angle, from (i) an absolute bearing that is indicated by the attribute information that is included in the link data of the current link, and (ii) an absolute bearing that is indicated by the attribute information that is included in the link data of the next link. The control portion 20 compares the calculated value with a predetermined threshold value, and calculates a relationship between the current link and the next link, i.e. whether a right turn or a left turn is required to proceed to the next link from the current link (step S113).

Then, the control portion 20 judges whether a right turn or a left turn is required at an intersection or a point on the road that corresponds to each node, on the basis of the calculation result obtained at the step S113 (step S114).

If it is judged that the right turn is not required at the step S114 (step S114: NO), the control portion 20 judges whether the left turn is required, on the basis of the calculation result obtained at the step S113 (step S115).

On the other hand, if the right turn is required at the step S114 (step S114: YES), the control portion 20 performs a judgement about the road width of the current link, on the basis of the attribute information of the node or the link, which is included in at least one of the node data and the link data of the current link. More specifically, the control portion 20 judges whether the road width, the number of lanes and so on, which are indicated by the attribute information of the node or the link, is wide (e.g. 10 meters or more), many (e.g. two lanes or more on one side) and so on, with regard to the road of the current link. Furthermore, the control portion 20 performs a judgement about the road width of the next link, similarly to the case of the current link, on the basis of the attribute information of the node or the link, which is included in at least one of the node data and the link data of the next link (step S116).

The judgement at the step S116 is intended to judge difficulty (or facility) of a right turn at an intersection. For example, a right turn from a wide road such as highway or trunk road to a narrow road such as street or avenue often has difficulty because traffic on the opposite lane is typically dense. On the contrary, a right turn between roads of the same rank, such as a right turn from a street to another street, is easy because traffic on the opposite lane is typically sparse. On the basis of the above consideration, the intersection in the latter case is judged easy to turn right, and the intersection in the former case is judged that it may be difficult to turn right.

If the road of the current link or the next link is judged wide (step S116: YES), that is, it is judged that it may be the intersection having the difficulty of the right turn, the control portion 20 judges whether or not the intersection, which corresponds to a node at which the current link connects to the next link, is the intersection without a right turn lane, otherwise the intersection without a signal with a right turn indicator (step S117), on the basis of the attribute information of the node or the link, which is included in at least one of the node data or the link data of the current link. The judgement at the step S117 is intended to judge difficulty (or facility) of a right turn at an intersection. For example, even though a right turn from a wide road such as highway or trunk road to a narrow road such as street or avenue often has difficulty because traffic on the opposite lane is typically dense, the intersection having the right turn lane and the signal with the right turn indicator is typically easy to turn right. On the basis of the above consideration, the intersection in this case is judged easy to turn right.

If it is judged that the intersection, which corresponds to the node at which the current link connects to the next link, is the intersection without the right turn lane, otherwise the intersection without the signal with the right turn indicator (step S117: NO), the control portion 20 adds a relative high cost to the cost that is temporarily obtained at the step S112, so that the link cost of the next link that is obtained at the step S112 is representative of the difficult right turn (step S118). That is, if the intersection is judged difficult to turn right on the basis of the judgement at the steps S116 and S117, an additional cost ΔC is relatively increased at the step S118. On the contrary, if the intersection is judged easy to turn right on the basis of the judgement at the steps S116 and S117, an additional cost ΔC is relatively decreased at the step S119, which is discussed below. That is, with regard to the same right turn, if it is difficult to turn right, the additional cost due to the right turn is defined as ΔCR1 (step S118), if it is easy to turn right, the additional cost due to the right turn is defined as ΔCR2 (step S119), wherein ΔCR1>ΔCR2. In other words, the link cost is increased or decreased in two cases even though they are all the right turn. In this arrangement, a further optimized route searching can be presented, depending on actual road conditions, as discussed below, in comparison with such an arrangement that an additional cost is defined as ΔCR equally for right turns, or defined as ΔCL equally for left turns, wherein ΔCR>ΔCL.

Incidentally, at the step S118 in this embodiment, a constant ΔCR1 may be defined as the additional cost as for the intersection that is judged difficult to turn right on the basis of the judgement at the steps S116 and S117. Nevertheless, the additional cost ΔCR1 as for the intersection that is judged difficult to turn right may be varied so that the additional cost ΔCR1 increases or decreases more specifically depending on various individual cases. That is, even with regard to the same intersection that is judged difficult to turn right, the link cost may further be varied so that the link cost increases or decreases depending on the difficulty in the right turn. For example, with regard to the intersection that corresponds to the node at which the current link connects to the next link, if there is no right turn lane, but the signal with the right turn indicator, the link cost of the next link may be increased by +4.0 points, otherwise if there is no right turn lane, nor the signal with the right turn indicator, the link cost of the next link may be increased by +5.0 points.

On the other hand, (i) if it is judged at the step S115 that the left turn is required (step S115: YES), (ii) if it is judged at the step S116 that the roads of the current link and the next link are the narrow roads (step S116: NO), or (iii) if it is judged at the step S117 that the intersection corresponding to the node at which the current link connects to the next link has the right turn lane and the signal with the right turn indicator (step S117: YES), a relative low cost is added to the cost that is temporarily obtained at the step S112 (step S119), so that the link cost of the next link that is obtained at the step S112 is representative of the easy right turn. That is, with regard to the intersection that is judged difficult to turn right, the additional cost ΔC is relatively increased at the step S118. On the contrary, with regard to the intersection that is judged easy to turn right, the additional cost ΔC is relatively decreased at the present step S119. Thus, in this embodiment, even with regard to the same right turn, the cost is intended to increase or decrease in at least two cases at the steps S118 and S119, depending on the difficulty of the right turn.

Incidentally, at the step S119 in this embodiment, with regard to the intersection that is judged easy to turn right on the basis of the judgement at the steps S116 and S117, a constant ΔCR2 may be added as the additional cost. Nevertheless, the additional cost ΔCR2, as for the intersection that is judged easy to turn right, may be varied so that the additional cost ΔCR2 increases or decreases more specifically depending on various individual cases. That is, even with regard to the same intersection that is judged easy to turn right, the link cost may further be varied so that the link cost increase or decrease depending on the facility of the right turn.

At the step S119, the additional cost for the intersection that is judged easy to turn right may equal to the additional cost for the intersection at which the left turn is required, for the simplification of the processing. Nevertheless, the additional cost for the intersection at which the right turn is required, regardless of its easiness, is preferably bigger than the additional cost for the intersection at which the left turn is required. For example, the link cost of the next link at the intersection at which the left turn is required may be increased by +2.0 points, and the link cost of the next link at the intersection at which the easy right turn is required may be increased by +3.0 points. In this arrangement, the link cost of the next link in the case that the next link is in a "left turn" relationship relative to the current link is bigger in its value than the link cost of the next link in the case that the next link is in a "go straight" relationship relative to the current link. Furthermore, the link cost of the next link in the case that the next link is in an "easy right turn" relationship relative to the current link is bigger in its value than the link cost of the next link in the case that the next link is in the "left turn" relationship relative to the current link.

Then, after the steps S118 and S119, otherwise if it is judged that the left turn is not required at the step S115 (i.e. in the case that the intersection is regarded as "go straight" in accordance with traffic laws and regulations, although a slight angle is actually formed by two crossing roads) (step S115: NO), the control portion 20 outputs the link cost of the next link as the result of either the step S112, the step S118 or the step S119 (step S120). Then, the link cost calculation processing ends.

Incidentally, the additional cost depending on the difficulty or the facility of the right turn at each node may be added during the calculation of the individual link cost. Alternatively it may be added collectively after the temporal calculation of the total cost of the route option consisting of a series of links to the second point, so that the additional costs are added depending on the difficulty or the facility of the right turn, on the basis of the judgement whether each individual intersection in the route option is of the "right turn".

Figure 3:
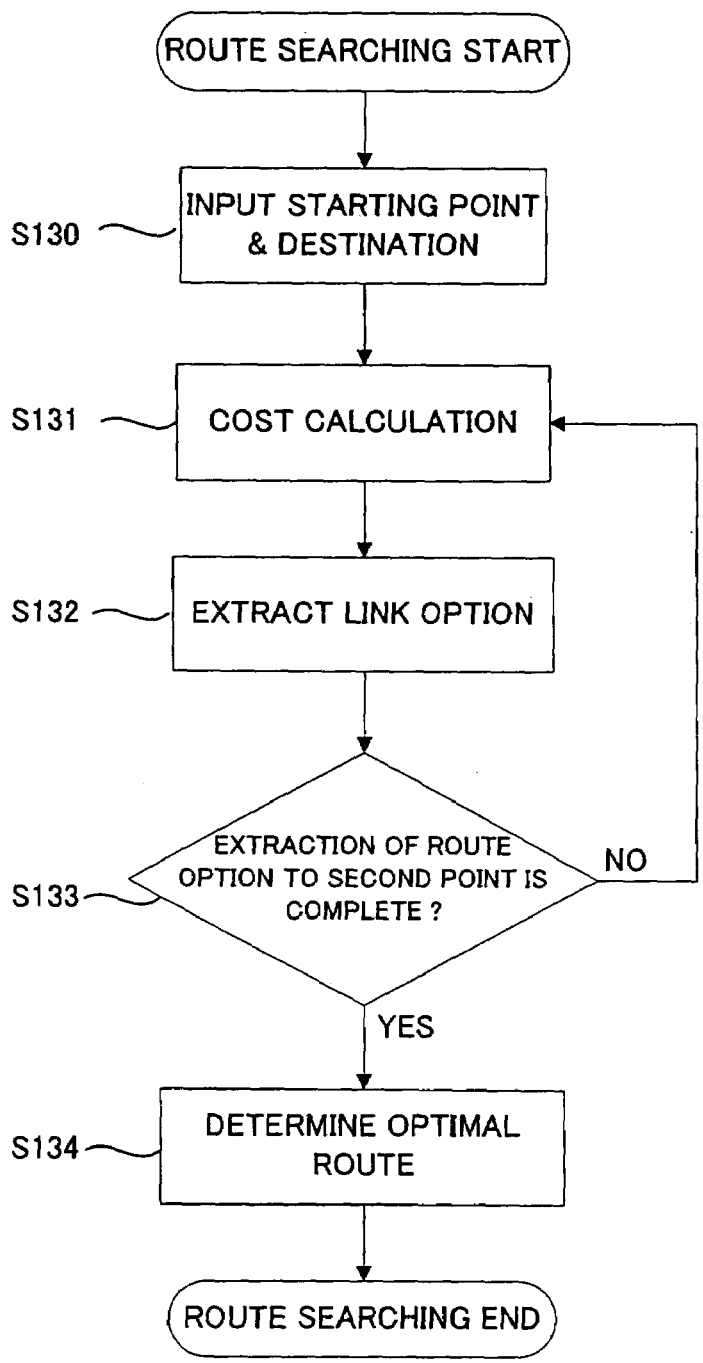
FIG. 3 is a flow chart illustrating another operation of predetermined navigation processings of the navigation apparatus in the embodiment of the present invention.

Next, with reference to FIG. 3, a route searching processing that is performed in the route searching system included in the navigation apparatus in this embodiment will be discussed. FIG. 3 is a flow chart illustrating a route searching processing.

In FIG. 3, at the control portion 20 firstly, an input setting of the first position as a start point and the second point as a destination point is performed via a menu screen or the like (step S130).

Next, the link costs of each link from the first point to the second point are calculated, respectively (step S131). Then, the link having the low link cost determined by the above calculation is extracted as a link option (i.e. link candidate) from among the links to the second point (step S132). At the step S131, the control portion 20 calculates the link costs as for the individual links in accordance with the procedure discussed with reference to FIG. 2. Particularly, even with regard to the same right turn link, the control portion 20 increases/decreases the link costs in at least two cases, depending on the difficulty or the facility of the right turn. This extraction of a link option performed on the basis of the link cost calculation is repeated, until that the predetermined number (e.g. one or more) of route options, each of which consists of a series of link options from the first point to the second point, are extracted, or until that a route option whose total cost is under a predetermined value is extracted. Otherwise, this extraction is repeated a predetermined times or for a predetermined time period (step S133: NO). Then, once the extraction of the route option completes (step S133: YES), one route option whose total cost is the lowest is determined as an optimal route from among the route options from the first point to the second point. Otherwise, in the case that only one route option is extracted, this route option is determined as an optimal route (step S134). Then, a series of route searching processings completes.

Figure 4:
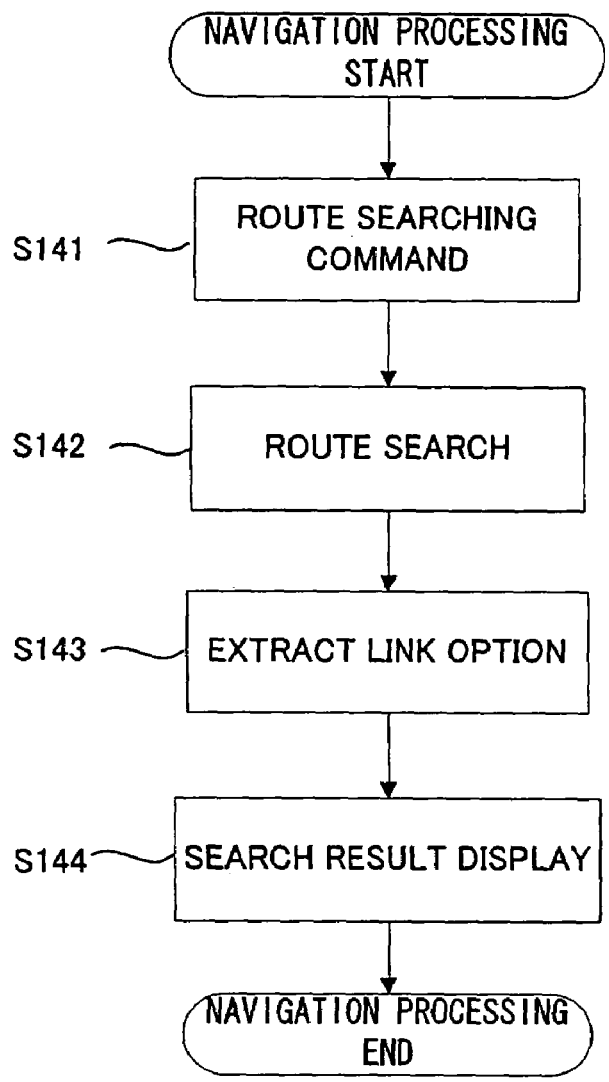
FIG. 4 is a flow chart illustrating another operation of predetermined navigation processings of the navigation apparatus in the embodiment of the present invention.

Next, with reference to FIG. 4, navigation processings performed by the navigation apparatus according to the present invention will be discussed. FIG. 4 is a flow chart illustrating navigation processings.

In FIG. 4, firstly, once a driver gives the navigation apparatus a command or instruction to search the optimal route from among the route options from the first point to the second point (step S141), the control portion 20 in the navigation apparatus performs the route searching (step S142). Next, the optimal route that is determined from the route searching is presented to the driver via the video output portion 40 or the audio output portion 50 (step S143). On this occasion, a current position is measured by a locating device such as the GPS or the like, and displayed on a map display with the optimal route. The driver can drive a car (step S144) and arrive at the second point, in accordance with the optimal route that is obtained by the route searching.

Incidentally, with regard to a re-route searching that is performed in a case that the current position of the car deviates from the optimal route, the current position is defined as the first point and the route searching processing at the step S142 is performed, similarly to the route searching.

Figure 5:
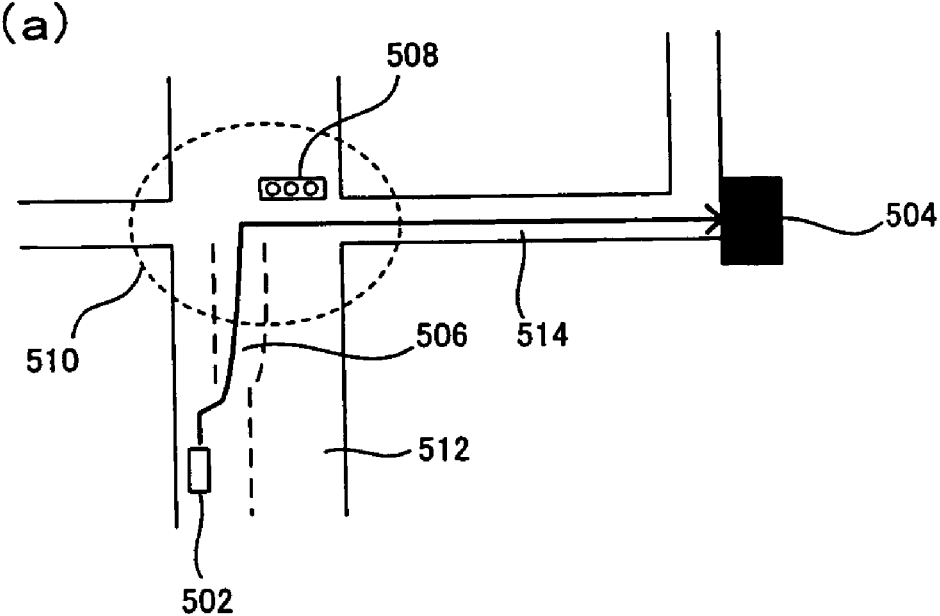
FIGS. 5a and 5b are map views schematically illustrating a route searched by an embodiment of the present invention and a comparative embodiment thereof.
Figure 5:
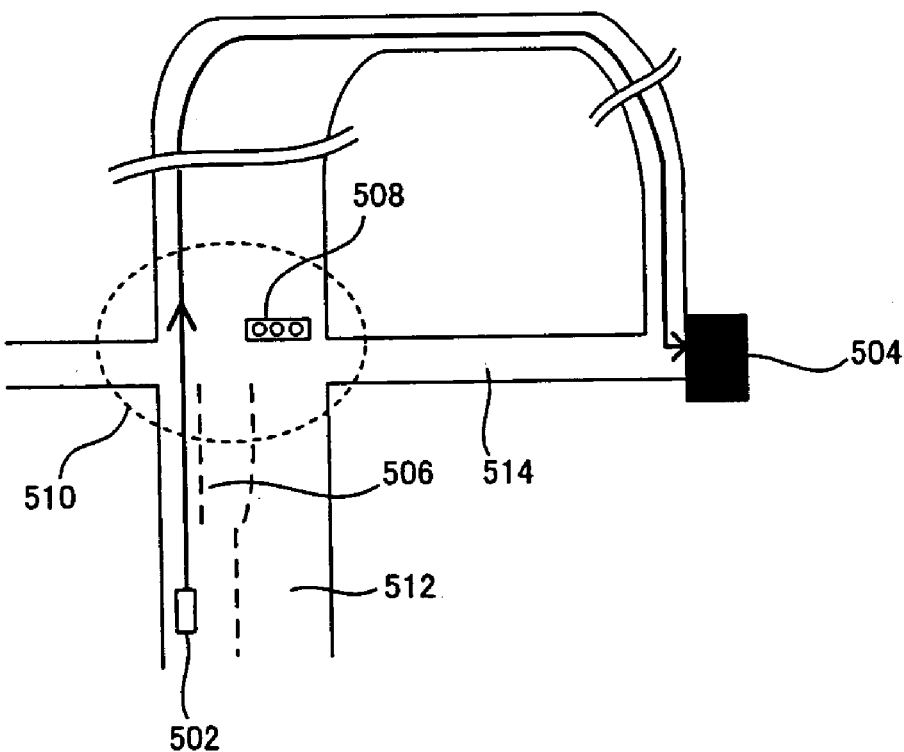
Figure 6:
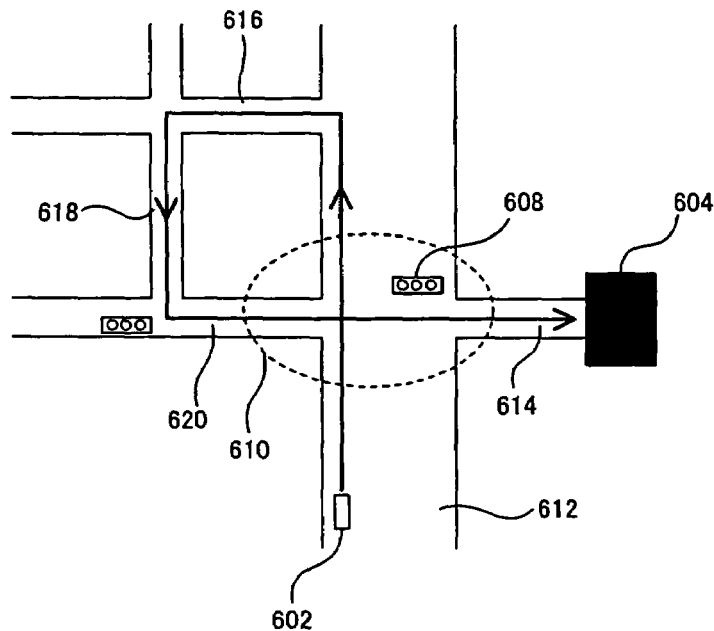
FIGS. 6a and 6b are map views schematically illustrating another route searched by an embodiment of the present invention and a comparative embodiment thereof.
Figure 6:
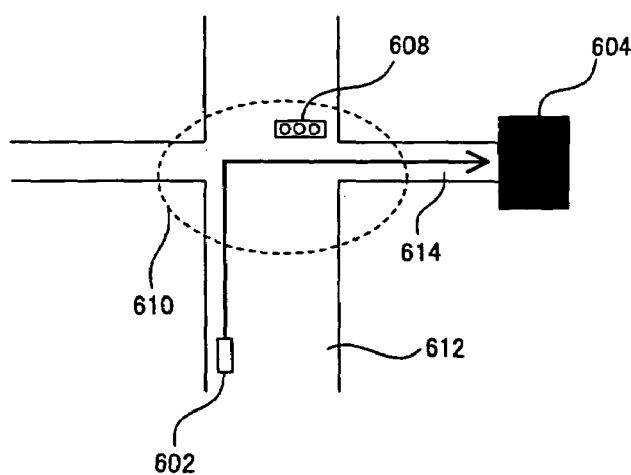

Now, with reference to FIG. 5 and FIG. 6, the route searching in this embodiment, particularly its advantages will be discussed, in comparison with a comparative embodiment. FIG. 5 (a) is a map view in which one route that is determined as the optimal route from the route searching in this embodiment is schematically displayed, under certain road condition. FIG. 5 (b) is another map view in which one route that is determined as the optimal route from the route searching in the comparative embodiment is schematically displayed, under the certain road condition. FIG. 6 (a) is another map view in which one route that is determined as the optimal route from the route searching in this embodiment is schematically displayed, under another road condition. FIG. 6 (b) is a map view in which one route that is determined as the optimal route from the route searching in the comparative embodiment is schematically displayed, under said another road condition.

As shown in FIG. 5 (a) and FIG. 5 (b), there are a road section 512 having a plurality of lanes on one side and a road section 514 that is narrower than the road section 512, i.e. whose width is narrow. At an intersection 510 of the road section 512 and the road section 514, a right turn lane 506 and a signal with a right turn indicator 508 exist. Therefore, the intersection 510 shown in FIGS. 5 (a) and (b) is considered as an easy intersection to turn right under actual road conditions or actual traffic conditions.

According to the route searching in this embodiment, for example as a result of a fact that such difficulty or facility in the right turn is reflected in the route searching shown in FIG. 3 in which the cost calculation shown in FIG. 2 is employed, a route shown by an arrow in FIG. 5 (a), that is, a route that turns right at the intersection 510, and then goes straight along the road section 514 from the intersection 510 to the second point 504, and finally reaches the second point 504, is determined as an optimal route.

On the contrary, in the route searching in the comparative embodiment in which a route whose number of the right turns is the fewest is determined as an optimal route, or in which a high cost is assigned equally to each individual right turn, the route shown by the arrow in FIG. 5 (a) is eliminated, and a route that passes the intersection 510 from the first point 502, and then advances along the road, and finally reaches the second point 504, as shown by an arrow in FIG. 5 (b), is determined instead as an optimal route.

As seen from FIG. 5, according to the route searching in this embodiment, the route shown by the arrow in FIG. 5 (a), that is, the route that reaches the second point 504 for the shortest time after the right turn is not eliminated but determined as the optimal route.

On the other hand, as shown in FIG. 6 (a) and FIG. 6 (b), there are a road section 612 having a plurality lanes on one side and a road section 614 that is narrower than the road section 612, i.e. whose width is narrow. At an intersection 610 of the road section 612 and the road section 614, no right turn lane and a signal 608 exist, although the signal 608 is not provided with a right turn indicator. Therefore, the intersection 610 shown in FIGS. 6 (a) and (b) is considered as a difficult intersection to turn right under actual road conditions or actual traffic conditions.

According to the route searching in this embodiment, for example as a result of a fact that such difficulty or facility of the right turn is reflected in the route searching shown in FIG. 3 in which the cost calculation shown in FIG. 2 is employed, a route shown by an arrow in FIG. 6 (a), that is, a route that passes through the intersection 610 from the first point 602 and goes straight along the road, and then turns left three times passing through road sections 616, 618 and 620, and then passing through the intersection 610 again, and then goes straight along the road section 614, and finally reaches the second point 604, is determined as an optimal route.

On the contrary, in the route searching in the comparative embodiment in which a constant cost is assigned equally to each individual right turn, a route that turns right at the intersection 610, and then goes straight along the road section 614, and finally reaches the second point 604, as shown by an arrow in FIG. 6 (b), is determined instead as an optimal route. In this case, compared to the route shown by the arrow in FIG. 6 (a), a length of the optimal route is shortened. According to the route shown by the arrow in FIG. 6 (b), however, it takes a considerable time to turn right at the intersection 610.

As seen from FIG. 6, according to the route searching in this embodiment, the route shown by the arrow in FIG. 6 (a), that is, another route option involving no right turn is determined as the optimal route, in the case that a route option, which may be shown by the arrow in FIG. 6 (b), takes a considerable time to turn right itself, although the route option is the shortest to the destination after the right turn.

According to the first embodiment, as discussed with reference to FIG. 1 to FIG. 6, even with regard to the same right turn, the optimal route can be determined, taking account of traffic conditions under which the difficulty or facility of the right turn is varied. Thus, the optimal route searching further adapted to actual traffic conditions can be performed.

(Variants of First Embodiment)

With regard to FIG. 7 to FIG. 9, variants of the first embodiment will be discussed.

Firstly, with reference to FIG. 7, a first variant will be discussed. FIG. 7 is a flow chart illustrating a cost calculation processing in the first variant. Incidentally, in FIG. 7, the same steps as those shown in FIG. 3 carry the same numerals, and the explanation thereof is omitted, as appropriate.

Figure 7:
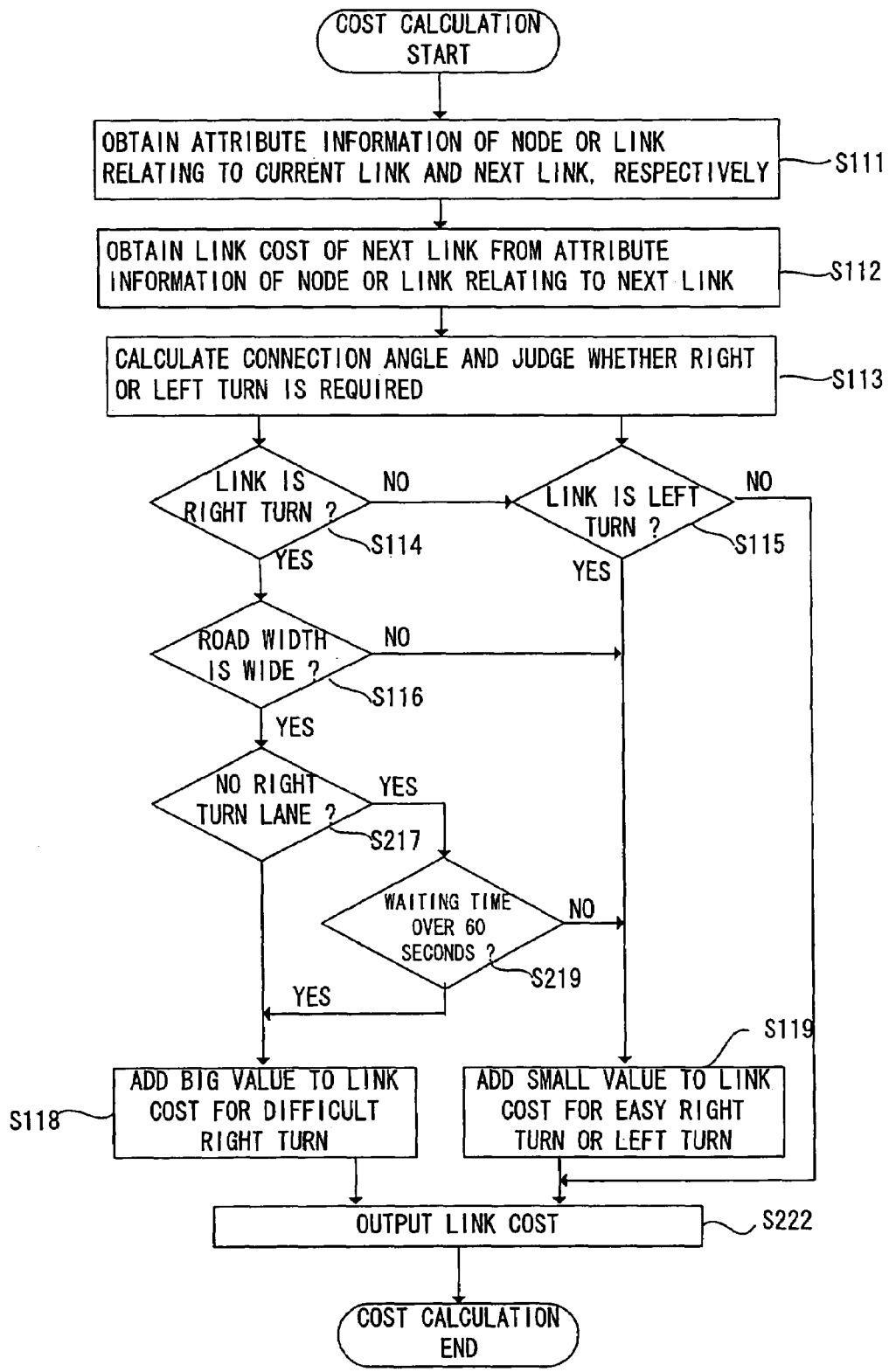
FIG. 7 is a flow chart illustrating an operation of predetermined navigation processings of the navigation apparatus in the embodiment of the present invention.

In the first variant, as shown in FIG. 7, it is judged whether or not the right turn lane exists on the road of the current link (step S217), on the basis of the attribute information of the node or the link, which is included in at least one of the node data and the link data of the current link, instead of the operation at the step S117 discussed with reference to FIG. 2 (step S217).

If the right turn lane exists on the road of the current link (step S217: NO), the control portion 20 judges whether an average waiting time on the right turn lane is short or not, for example, it takes more than thirty seconds, on the basis of the attribute information of the current link, or whether the average waiting time on the right turn lane is short or not, for example, it takes more than sixty seconds, on the basis of information, such as VICS or the like, that is typically updated in real time (step S219).

If the average waiting time on the right turn lane that exists on the road of the current link or the current waiting time is more than sixty seconds (step S219: YES), the process goes to the step S118, where the right turn in this case is judged difficult and a high cost is added, similarly to the first embodiment.

If the average waiting time on the right turn lane that exists on the road of the current link or the current waiting time is not more than sixty seconds (step S219: NO), the process goes to the step S119, where the right turn in this case is judged easy and a low cost is added, similarly to the first embodiment.

Incidentally, at the step S118 in this embodiment, a constant cost may be added to the intersection that is judged difficult to turn right (may also simply referred to as "difficult intersection"). Nevertheless, the additional cost as for the difficult intersection may be increased or decreased more specifically in a plurality of cases. For example, depending on a condition whether the average waiting time or the current waiting time is not more than one hundred twenty seconds, the additional cost may be varied in further two ways. Similarly, at the step S119 in this embodiment, a constant cost may be added to the intersection that is judged easy to turn right (may also simply referred to as "easy intersection"), the additional cost as for the easy intersection may be increased or decreased more specifically in a plurality of cases. For example, depending on a condition whether the average waiting time or the current waiting time is not more than thirty seconds, the additional cost may be varied in two ways.

Other constructions and operations in the first variant are the same as the first embodiment.

Therefore, according to the first variant, the optimal route searching further adapted to actual traffic conditions can be performed.

Next, with reference to FIG. 8, a second variant will be discussed. FIG. 8 (a) and FIG. 8 (b) are conceptual views illustrating a principle of a cost calculation in the second variant, respectively.

In the first embodiment, as discussed with reference to FIG. 2, predetermined values are added, at the steps S118 and S119 respectively, to the link cost of the next link that is temporarily calculated at the step S112.

Figure 8:
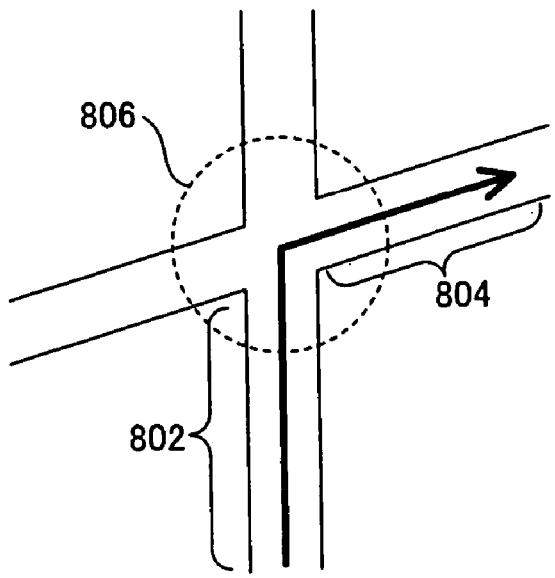
FIGS. 8a and 8b are conceptual views illustrating a principle of a cost calculation in a variant of the embodiment of the preset invention.
Figure 8:
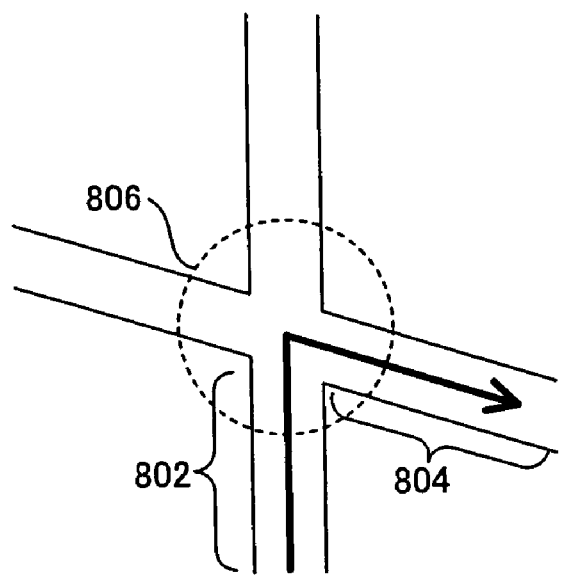

As shown in FIG. 8 (a), in the case that a connection angle is obtuse, an intersection at which a road section 802 of the current link connects to a road section 804 of the next link is relatively easy to turn. Therefore, in this case, no predetermined value is added to the link cost of the next link otherwise the additional cost is limited to a small value, and thereby the link cost of the next link becomes relatively low.

As shown in FIG. 8 (b), in the case that a connection angle is acute, an intersection at which a road section 802 of the current link connects to a road section 804 of the next link is relatively difficult to turn. Therefore, in this case, a predetermined value is added to the link cost of the next link otherwise the additional cost is increased, and thereby the link cost of the next link becomes relatively high.

Therefore, according to the second variant, the link cost as for a route option involving a sharp curve that is often difficult to turn is relatively increased. Consequently, it is hardly selected as the optimal route. Therefore, according to the second variant, the optimal route searching further adapted to actual traffic conditions can be performed.

Additionally, in the cost calculation processings in the first embodiment discussed above, the difficulty or facility of the curve is judged, on the basis of judgement at the steps S116 and S117. In addition to the traffic conditions already discussed at the steps S116 and S117, however, the intersection at which the road of the current link connects to another road of the next link may be difficult to turn in actual traffic conditions as follows. That is, in the case that a road width of the next link is extremely narrow, a signal with a right turn indicator does not exist at the intersection, and the intersection is not a right turn-recommended intersection, it is often difficult to turn. Even with regard to the intersection that is judged easy to turn, it may be apparent from a field research, that the intersection may be difficult to turn, or may be an intersection where accidents due to the right turn often occur.

In other variants of the first embodiment, therefore, instead of or in addition to the operation at the step S116 discussed with reference to FIG. 2, in the cost calculation processings in the first embodiment, the aforementioned traffic conditions are judged respectively, and the difficulty or facility of the turn is judged on the based of the former judgement of the traffic conditions. Therefore, according to this variant, the optimal route searching further adapted to actual traffic conditions can be performed.

(Second Embodiment)

Figure 9:
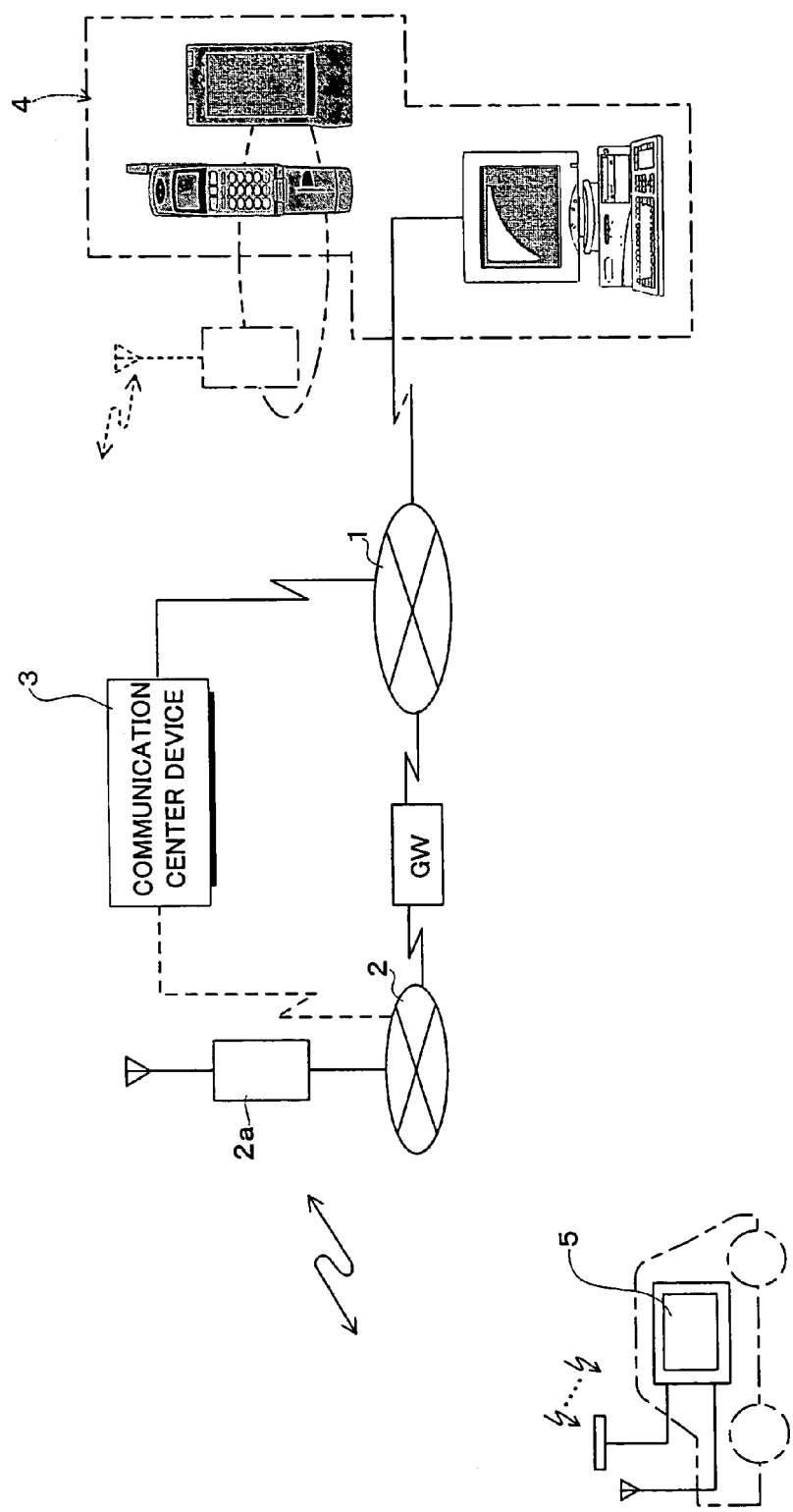
FIG. 9 is a block diagram illustrating a fundamental configuration of a communication type navigation apparatus in an example of the present invention.

With reference to FIG. 9, a second embodiment of the navigation system according to the present invention will be discussed. The second embodiment is constructed as a communication navigation system. FIG. 9 is a block diagram illustrating an entire configuration of the communication navigation system in the second embodiment.

In FIG. 9, there are provided in this embodiment: a digital fixed communication network 1; and a digital mobile communication network 2, which are connected to each other via a gateway (GW) device for converting a communication protocol. In these communication networks, an IP packet communication is performed under TCP/IP (Transmission Control Protocol/Internet Protocol) environment. Incidentally, an analog fixed communication network may be used, instead of the digital fixed communication network 1.

A communication center device 3 for a communication navigation supplier; and a personal computer or the like that is disposed at a user's home as an example of a communication terminal 4 for a user are connected to the digital fixed communication network 1. A cell phone, a PDA (Personal Digital Assistants) or the like is accommodated, as another example of the communication terminal 4, in a cell base station 2a of the digital mobile communication network 2, via a radio area (air interface). Furthermore, an on-vehicle communication navigation terminal 5 that is mounted on a user's vehicle is accommodated in the cell base station 2a.

The communication center device 3 is arranged to store an enormous volume of road map data, which is conventionally stored at the on-vehicle navigation apparatus, and also arranged to perform maintenance of the road map data and substitute the optimal route searching or the like, which is typically heavy duty.

The communication terminal 4 is arranged to request the map information supply or the optimal route searching to the communication center device 3, and also arranged to direct a transfer site to which the requested map information or the like is to be sent. Incidentally, the request of the direction of the transfer site may be performed from the communication navigation terminal 5, similarly to the communication terminal 4.

The communication terminal 5, which is for on-vehicle use, downloads a minimum requirement of the road map data to display a map from a map database in the communication center device 3, otherwise includes a record medium such as a DVD, a CD and so on in which at lease the minimum requirement of road map data is stored. Incidentally, at the communication terminal 5, a route guidance indicating "go straight", "turn left", "turn right" or the like at each guide point can be performed through the video output on the map display or the audio output from the speaker, on the basis of optimal route data indicating the optimal route as well as guide information relating to the optimal route or road map data of the area around the optimal route.

Thus, in the communication navigation system according to the second embodiment, at the communication terminal 5, it is not necessary to store the enormous amount of road map data, which may be required for a Dijkstra method. Thereby, a required memory capacity at the communication terminal 5 becomes remarkably small in comparison with a required memory capacity at the communication center device 3. Additionally, at the communication terminal 5, it is not necessary to perform the route searching, which is typically heavy duty and conventionally performed within the on-vehicle navigation apparatus. Thereby, a required throughput capacity at the communication terminal 5 becomes remarkably small in comparison with a required throughput capacity at the communicating center device 3. Additionally, with regard to a data amount of the road map data to be transferred, a minimum of data is sufficiently transmitted to perform the map display or the route guidance at the communication terminal 5. Thereby, this arrangement is remarkably advantageous in view of a fact that the transmission cost is saved or the required transmitting/receiving capacity is relatively low.

As discussed in detail, according to various embodiments of the present invention, even with regard to the same right turn for example, the optimal route searching can be performed, taking account of traffic conditions under which the difficulty or facility of the right turn is varied. Thus, the optimal route searching further adapted to actual traffic conditions can be performed.

Incidentally, in each embodiment discussed above, the link cost as for the right turn is increased or decreased depending on the difficulty or facility of the right turn, on the basis of a fact that Japan has a traffic rule according to which drivers keep to the left side of the road. Nevertheless, in the case that the United States of America that has a traffic rule according to which drivers keep to the right side of the road, this embodiment has the same effect and advantage only if the "right turn" and the "left turn" is reversed to each other.

The route searching system or the navigation system according to the preset invention is applicable not only to the aforementioned embodiments or on-vehicle apparatus as in the aforementioned embodiments, but also to various kinds of navigation apparatus for various vehicles such as two-wheeled vehicles, air planes, shipping and so on, or further for pedestrians, animals and so on equipped with PDA's, cell phones, and so on.

The invention may be embodied in other specific forms without departing from the spirit or essential characteristics thereof The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-122819 filed on Apr. 25, 2003 including the specification, claims, drawings and summary is incorporated herein by reference in its entirety.

What is claimed is:

1. A route searching system comprising:
   a road map database for storing a road map data, the road map data including (i) node data that indicates nodes that correspond to predetermined kinds of points on a road including at least an intersection, and (ii) link data that indicates a link that corresponds to a road section that connects the predetermined kinds of points on a road corresponding to the nodes; and
   a searching device for calculating link costs as for individual links that correspond to individual road sections that consist of individual route options from a first point to a second point, on the basis of said road map database, and thereby searching one of the individual route options whose total link cost is the lowest, as an optimal route, from among a plurality of links that correspond to all the road sections of the individual route options,
   wherein said searching device increases or decreases the link cost of a link corresponding to a road section that requires a difficult turn on the individual route options, the difficult turn being the right turn or the left turn one of which is more difficult than the other in accordance with a traffic rule, and connecting to a node that corresponds to the intersection, in at least two cases depending on difficulty of the difficult turn at the intersection.

2. The route searching system according to claim 1, wherein said searching device judges a link corresponding to the road section that requires the difficult turn, and connecting to a node that corresponds to the intersection, from among said plurality of links, on the basis of said road map database, and increases or decreases the link cost of the judged link, depending on the difficulty of the difficult turn.

3. The route searching system according to claim 1, wherein said searching device increases or decreases the link cost of a link corresponding to the road section that requires the difficult turn, depending on at least one of a road width, the number of lanes, a road type and an existence of a traffic signal, which are indicated by attribute information of the link or the node included in at least one of the link data or the node data.

4. The route searching system according to claim 1, wherein said searching device,
   firstly calculates temporarily link costs of a plurality of links corresponding to said all the road sections, and then
   judges whether or not a link corresponding to the road section that requires the difficult turn exists in said plurality of links corresponding to said all the road sections, and if exists, calculates link costs of said plurality of links corresponding to all the road sections, by adding a first predetermined value to link costs that are temporarily calculated, depending on the difficulty of the difficult turn.

5. The route searching system according to claim 4, wherein said searching device increases the first predetermined value, as a connection angle formed by two links connected to the node corresponding to the intersection decreases.

6. The route searching system according to claim 4, wherein said searching device temporarily calculates the link cost, and then judges whether or not a link corresponding to a road section that requires an easy turn, the easy turn being the right turn or the left turn one of which is easier than the other, exists in said plurality of links corresponding to said all the road sections, and if exists, calculates link costs of said plurality of links corresponding to said all the road sections, by adding a second predetermined value, which is smaller than the first predetermined value, to link costs that are temporarily calculated.

7. The route searching system according to claim 1, wherein said searching device determines a node corresponding to the intersection, on the basis of a connection angle formed by two links connected to each node on the route options, and increases the link cost of the link corresponding to the road section that requires the difficult turn and connecting to the determined node corresponding to the intersection.

8. The route searching system according to claim 1, further comprising:
 an inputting device for inputting a starting point or a current position as the first point and inputting a destination as the second point; and
 an outputting device for outputting the searched optimal route in a predetermined format.

9. A route searching system comprising:
 a road map database for storing a road map data, the road map data including data that indicates (i) intersections and (ii) a road section connecting the intersections; and
 a searching device for calculating a cost, that is a quantitative index of the difficulty or facility in driving as for individual road sections that consist of individual route options from a first point to a second point, on the basis of said road map database, and thereby searching one of the individual route options whose total cost is the lowest, as an optimal route, from among all the road sections of the individual route options,
 wherein said searching device increases or decreases the cost of a road section that requires a difficult turn after passing the intersection on the individual route options from among a plurality of road sections that consist of all road sections of the individual route options, the difficult turn being the right turn or the left turn one of which is more difficult than the other in accordance with a traffic rule, in at least two cases depending on difficulty of the difficult turn at the intersection.

10. The route searching system according to claim 9, further comprising:
 an inputting device for inputting a starting point or a current position as the first point and inputting a destination as the second point; and
 an outputting device for outputting the searched optimal route in a predetermined format.

11. A navigation system comprising:
 a route searching system provided with: a road map database for storing a road map data, the road map data including (i) node data that indicates nodes that correspond to predetermined kinds of points on a road including at least an intersection, and (ii) link data that indicates a link that corresponds to a road section that connects the predetermined kinds of points on a road corresponding to the nodes; and a searching device for calculating link costs as for individual links that correspond to individual road sections that consist of individual route options from a first point to a second point, on the basis of said road map database, and thereby searching one of the route options whose total link cost is the lowest, as an optimal route, from among a plurality of links that correspond to all the road sections of the individual route options, wherein said searching device increases or decreases the link cost of a link corresponding to a road section that requires a difficult turn on the individual route options, the difficult turn being the right turn or the left turn one of which is more difficult than the other in accordance with a traffic rule, and connecting to a node that corresponds to the intersection, in at least two cases depending on difficulty of the difficult turn at the intersection;
 a locating device for locating a current position; and
 a route guiding device for performing predetermined kinds of route guidance, on the basis of the current position that is located by the locating device and the optimal route that is searched by the searching device.

12. The navigation system according to claim 11, further comprising: a center device and a navigation terminal device, which are connected to each other via a communication network, wherein
 at least a part of said road map database is included in said center device, and
 said locating device and said route guiding device are included in said navigation terminal device.

13. A route searching method of calculating link costs as for individual links that correspond to individual road sections that consist of individual route options from a first point to a second point, on the basis of a road map database for storing a road map data, the road map data including (i) node data that indicates nodes that correspond to predetermined kinds of points on a road including at least an intersection, and (ii) link data that indicates a link that corresponds to a road section that connects the predetermined kinds of points on a road corresponding to the nodes; and thereby searching one of the route options whose total link cost is the lowest, as an optimal route, from among a plurality of links that correspond to all the road sections of the route options, said method comprising:
 a determining process of determining a link corresponding to a road section that requires a difficult turn on the route options, the difficult turn being the right turn or the left turn one of which is more difficult than the other in accordance with a traffic rule, and connecting to a node that corresponds to the intersection, on the basis of said road map database; and
 a increasing or decreasing process of increasing or decreasing the link cost of the determined link, in at least two cases depending on difficulty of the difficult turn at the intersection.

14. A route searching method of calculating a cost, that is a quantitative index of the difficulty or facility in driving as for individual road sections that consist of individual route options from a first point to a second point, on the basis of a road map database for storing a road map data, the road map data including data that indicates (i) intersections and (ii) a road section connecting the intersections; and thereby searching one of the individual route options whose total cost is the lowest, as an optimal route, from among all the road sections of the individual route options, said method comprising:

a determining process of determining a road section that requires a difficult turn after passing the intersection on the route options from among a plurality of road sections that consist of all road sections of the individual route options, the difficult turn being the right turn or the left turn one of which is more difficult than the other in accordance with a traffic rule; and an increasing or decreasing process of increasing or decreasing the cost of the determined road section, in at least two cases depending on difficulty of the difficult turn at the intersection.

15. A computer program product in a computer-readable medium for tangibly embodying a program of instructions executable by a computer to make the computer function as at least a searching device for calculating link costs as for individual links that correspond to individual road sections that consist of individual route options from a first point to a second point, on the basis of a road map database, and thereby searching one of the individual route options whose total link cost is the lowest, as an optimal route, from among a plurality of links that correspond to all the road sections of the individual route options, wherein said searching device increases or decreases the link cost of a link corresponding to a road section that requires a difficult turn on the individual route options, the difficult turn being the right turn or the left turn one of which is more difficult than the other in accordance with a traffic rule, and connecting to a node that corresponds to the intersection, in at least two cases depending on difficulty of the difficult turn at the intersection.

16. A navigation system comprising:
    a route searching system provided with: a road map database for storing a road map data, the road map data including data that indicates (i) intersections and (ii) a road section connecting the intersections; and a searching device for calculating a cost, that is a quantitative index of the difficulty or facility in driving as for individual road sections that consist of individual route options from a first point to a second point, on the basis of said road map database, and thereby searching one of the individual route options whose total cost is the lowest, as an optimal route, from among all the road sections of the route options, wherein said searching device increases or decreases the cost of a road section that requires a difficult turn after passing the intersection on the route options from among a plurality of road sections that consist of all road sections of the individual route options, the difficult turn being the right turn or the left turn one of which is more difficult than the other in accordance with a traffic rule, in at least two cases depending on difficulty of the difficult turn at the intersection;
    a locating device for locating a current position; and
    a route guiding device for performing predetermined kinds of route guidance, on the basis of the current position that is located by the locating device and the optimal route that is searched by the searching device.

17. A computer program product in a computer-readable medium for tangibly embodying a program of instructions executable by a computer to make the computer function as at least a searching device for calculating a cost, that is a quantitative index of the difficulty or facility in driving as for individual road sections that consist of individual route options from a first point to a second point, on the basis of said road map database, and thereby searching one of the individual route options whose total cost is the lowest, as an optimal route, from among all the road sections of the individual route options, wherein said searching device increases or decreases the cost of a road section that requires a difficult turn after passing the intersection on the individual route options from among a plurality of road sections that consist of all road sections of the individual route options, the difficult turn being the right turn or the left turn one of which is more difficult than the other in accordance with a traffic rule, in at least two cases depending on difficulty of the difficult turn at the intersection.

* * * * *